United States Patent [19]

Soligno

[11] 4,252,486
[45] Feb. 24, 1981

[54] SYSTEM FOR TRANSFERRING AND STORING ELONGATED ELEMENTS

[76] Inventor: Vincenzo Soligno, Via Pizzocorno 10, Ponte Nizza (PV), Italy

[21] Appl. No.: 1,073

[22] Filed: Jan. 5, 1979

[30] Foreign Application Priority Data

Jan. 10, 1978 [IT] Italy .................. 19140 A/78

[51] Int. Cl.³ .................. B66F 11/00; B65G 1/00
[52] U.S. Cl. .................. 414/276; 414/277;
414/282; 414/744 R; 414/745; 414/748;
414/754; 414/775; 414/782
[58] Field of Search .................. 414/277, 276, 280–283,
414/267, 745, 748, 222, 775, 782, 783, 754, 744
R, 225; 51/105 SP, 105 EC, 98.5, 125.5, 215 R,
215 E, 215 M

[56] References Cited

U.S. PATENT DOCUMENTS

| 2,525,305 | 10/1950 | Lombard | 414/745 X |
| 3,036,413 | 5/1962 | Schulte | 414/748 X |
| 3,432,076 | 3/1969 | Arsenault | 414/748 X |
| 3,593,823 | 7/1971 | Thompson | 414/277 X |
| 3,876,489 | 4/1975 | Chenel | 414/744 R X |

FOREIGN PATENT DOCUMENTS 54297 11/1966 Fed. Rep. of Germany .......... 414/748

Primary Examiner—Stephen G. Kunin
Assistant Examiner—Edmond G. Rishell, Jr.
Attorney, Agent, or Firm—Fleit & Jacobson

[57] ABSTRACT

A system for transferring tubes or bars or like elongated elements between a processing line and associated storage structures or intermediate delivery locations is disclosed. The system includes spacing stations for intermittently spacing groups of tubes or bars, apparatus for transporting the groups from one spacing station onto one of several storage cantilever supports adapted to support the tubes or bars with their axes parallel to that of the processing line, apparatus for intermittently laterally removing groups of spaced elongate elements from the storage supports via an intermediate supporting station, and apparatus for rotating the elements through 90° in order to deposit them on supports at the inlet end of the processing line with their axes at right angles to that of the processing line, or after removal from such supports onto an intermediate supporting station at the outlet end of the processing line.

9 Claims, 22 Drawing Figures

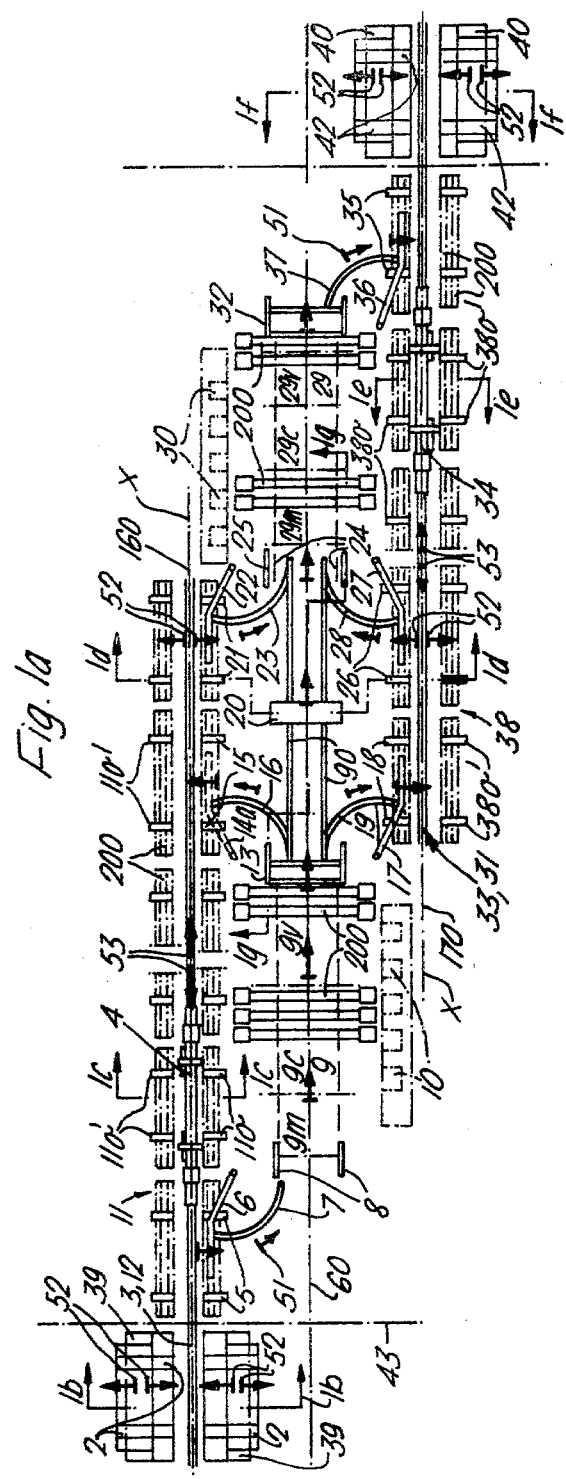

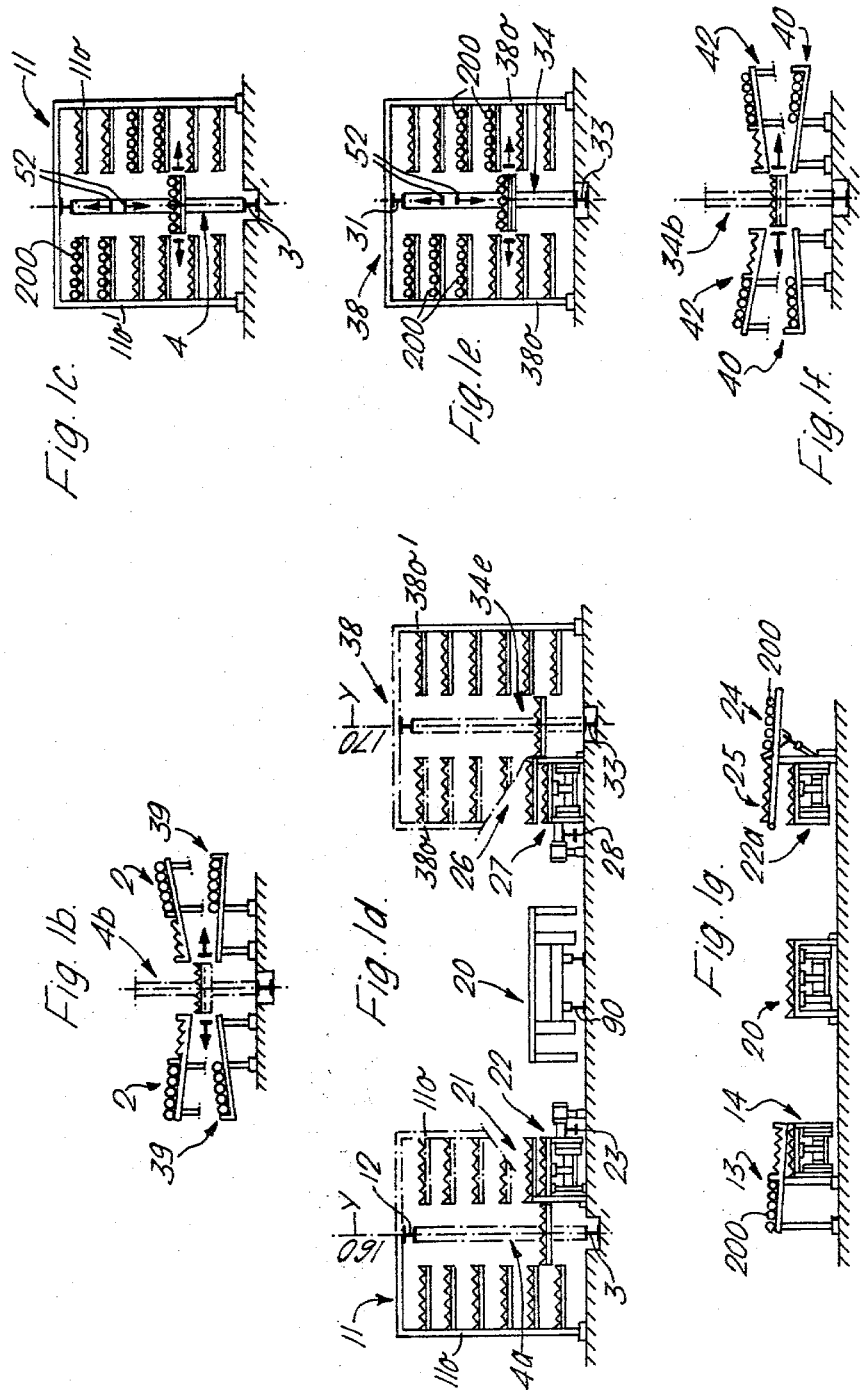

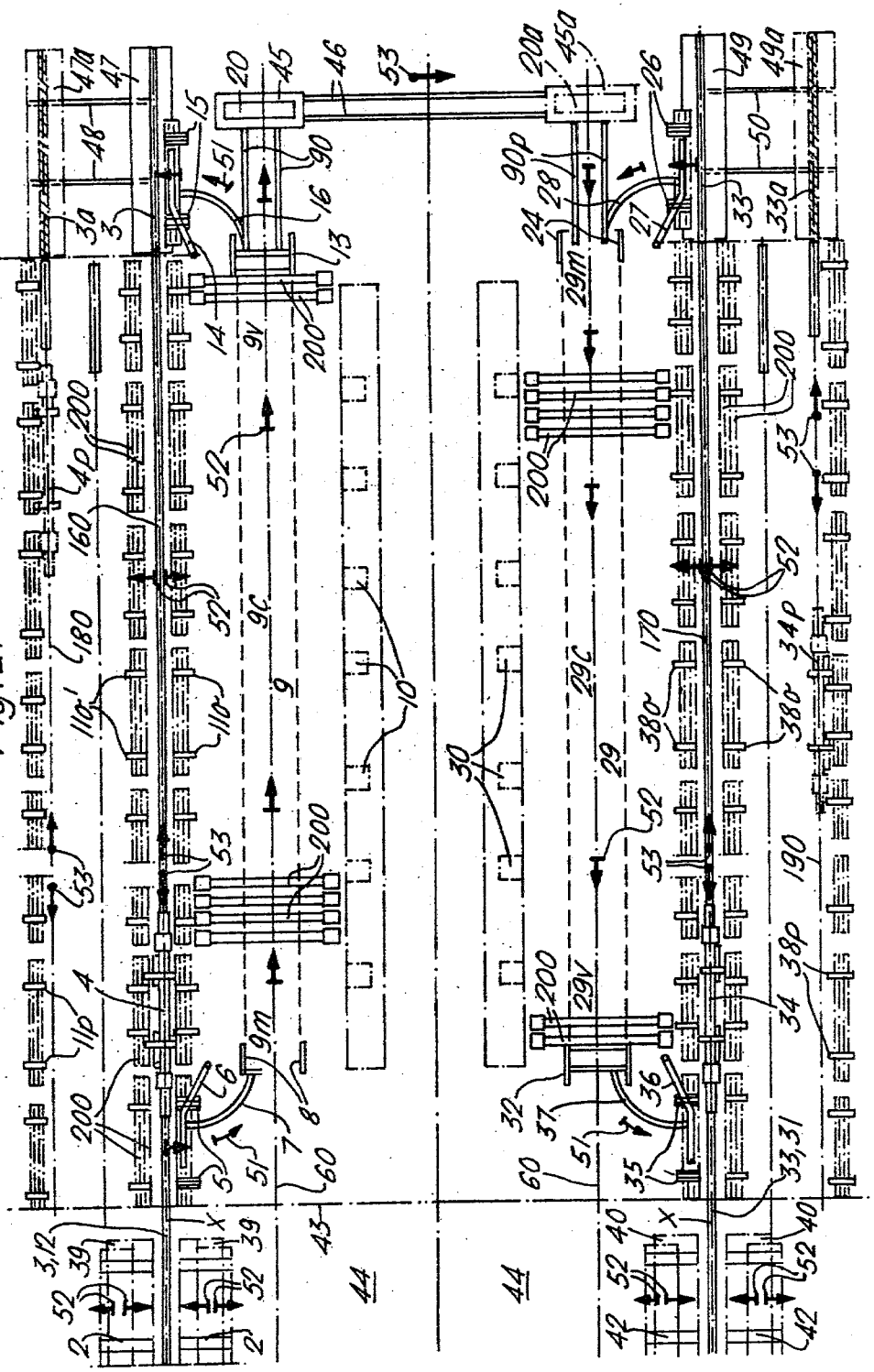

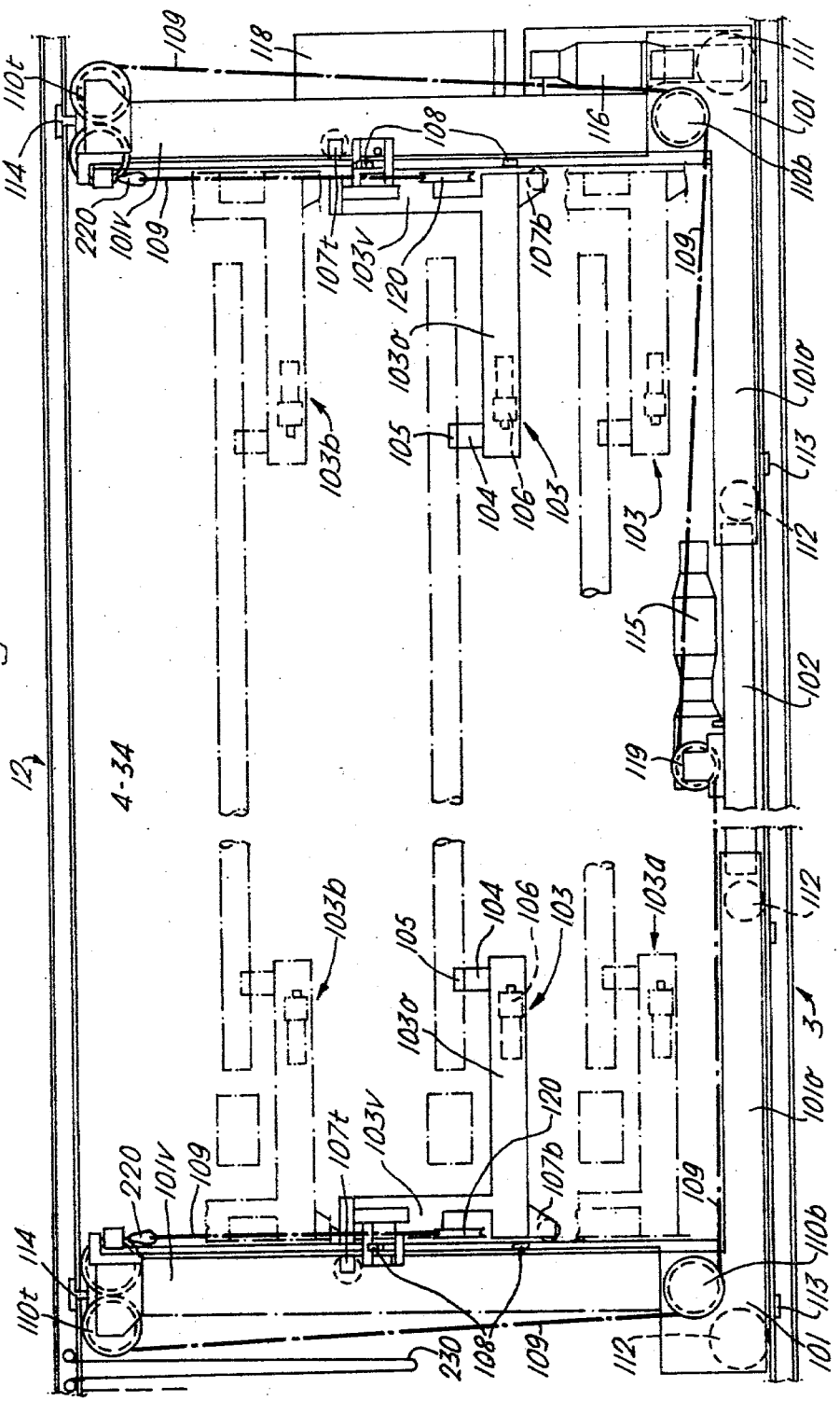

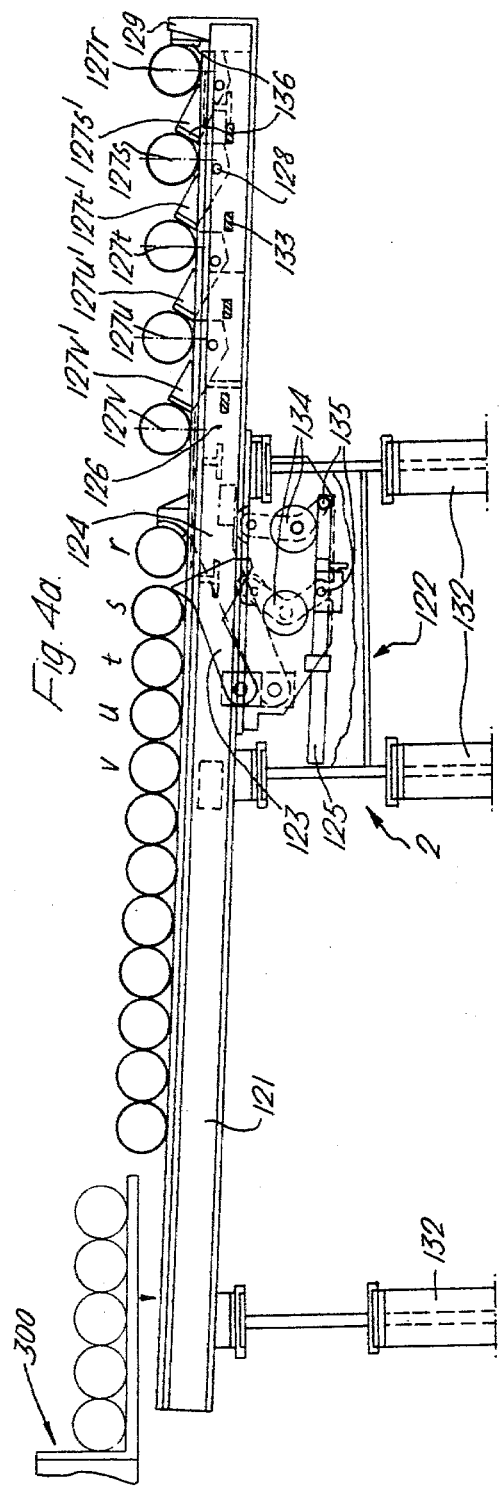
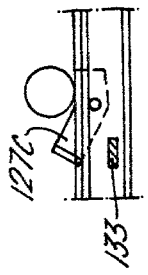
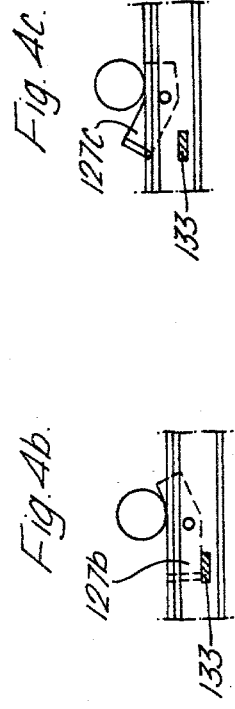

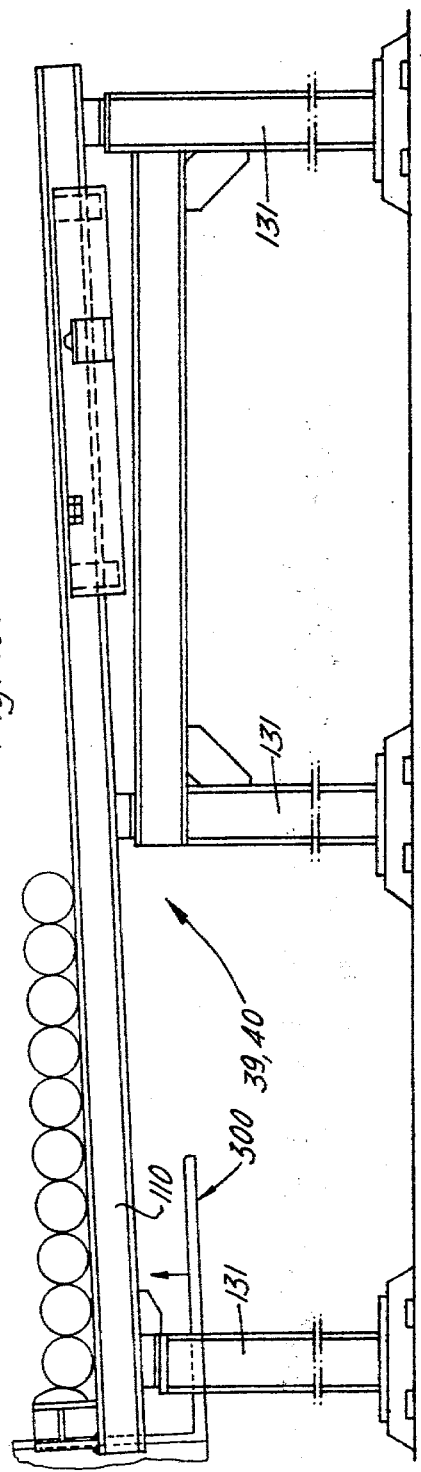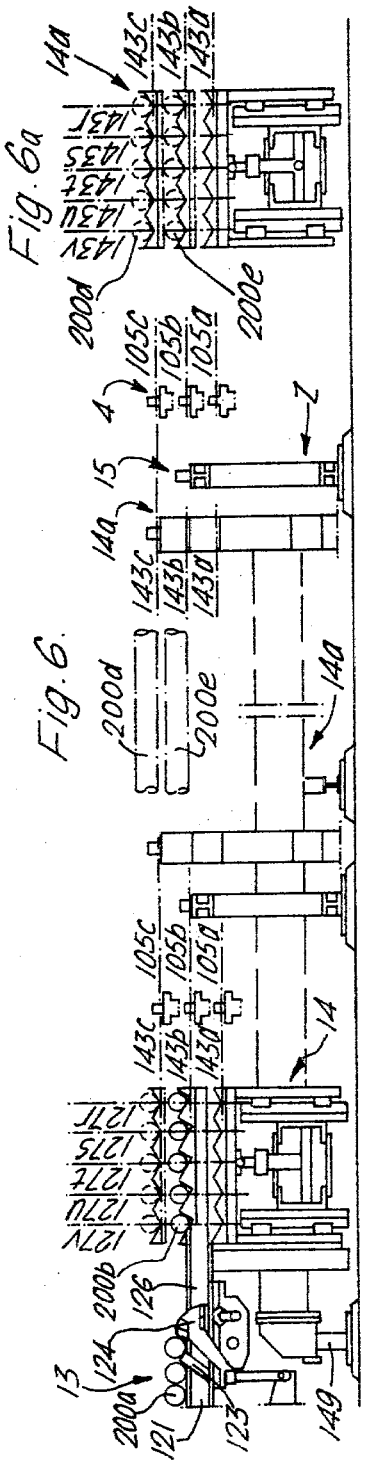

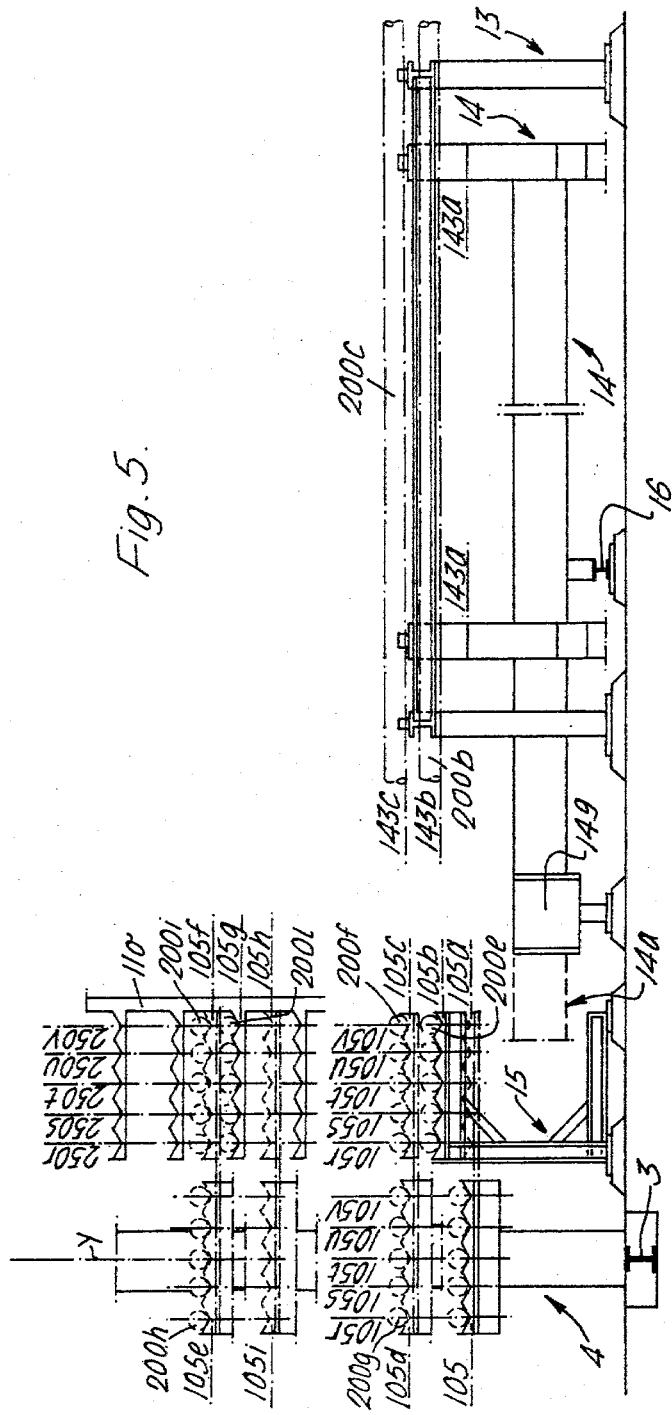

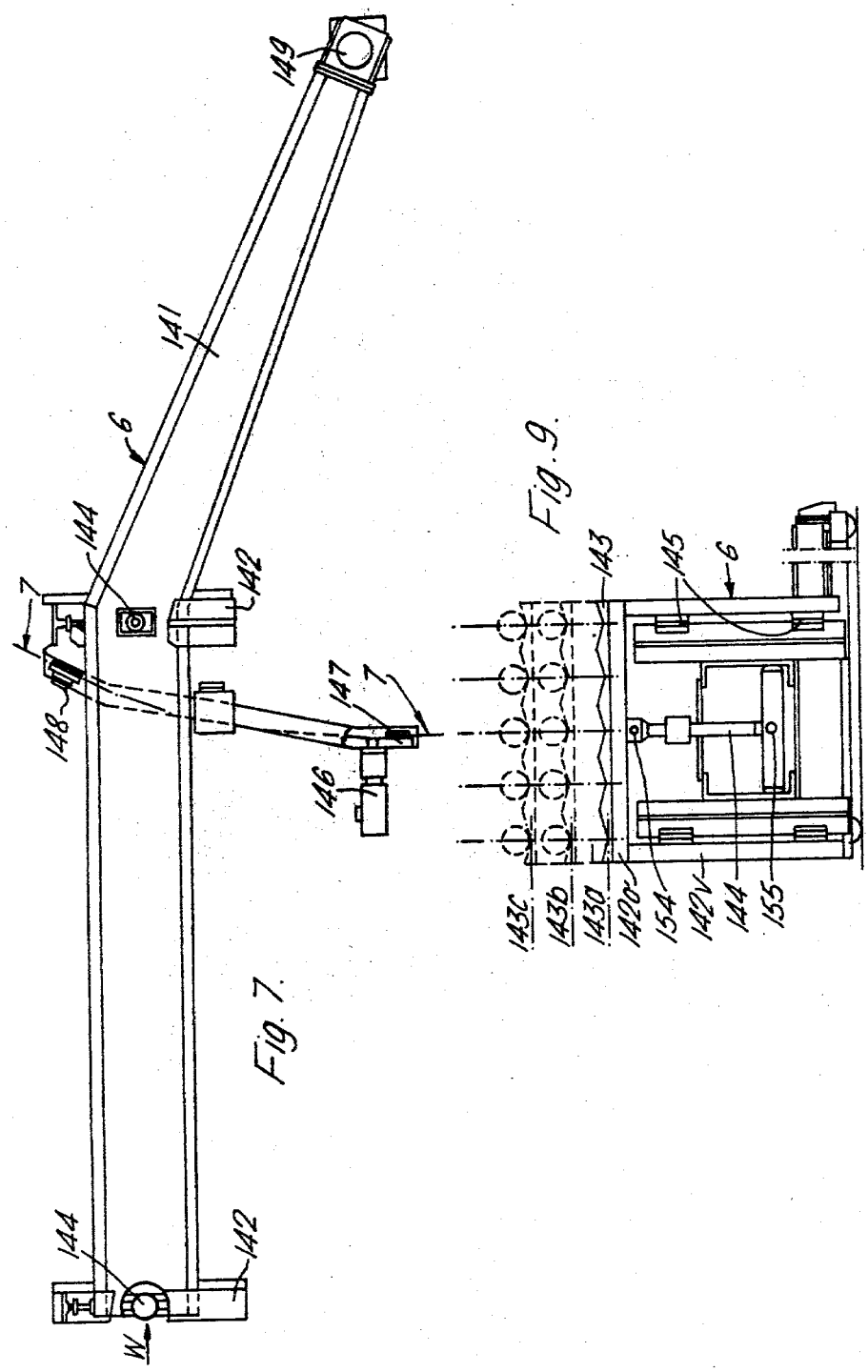

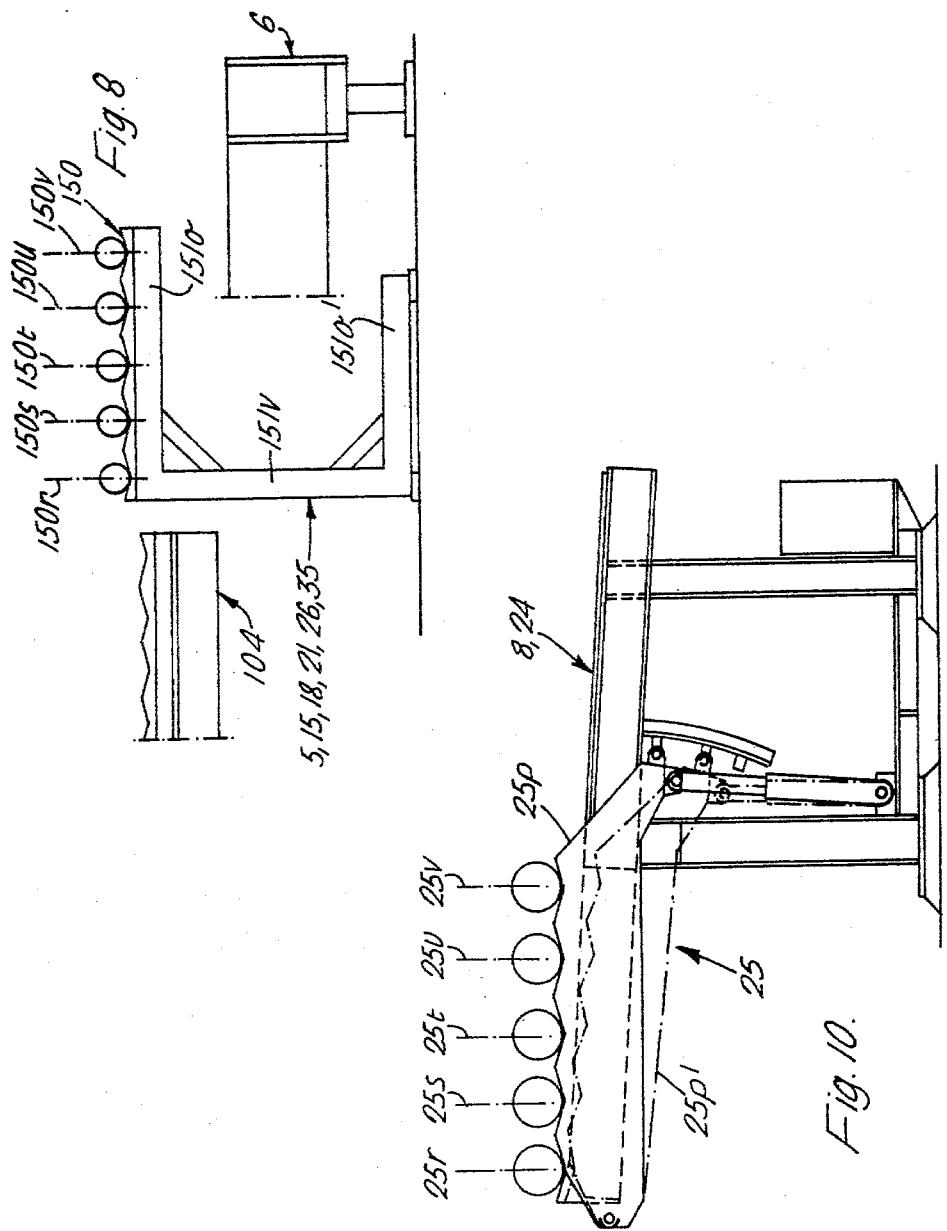

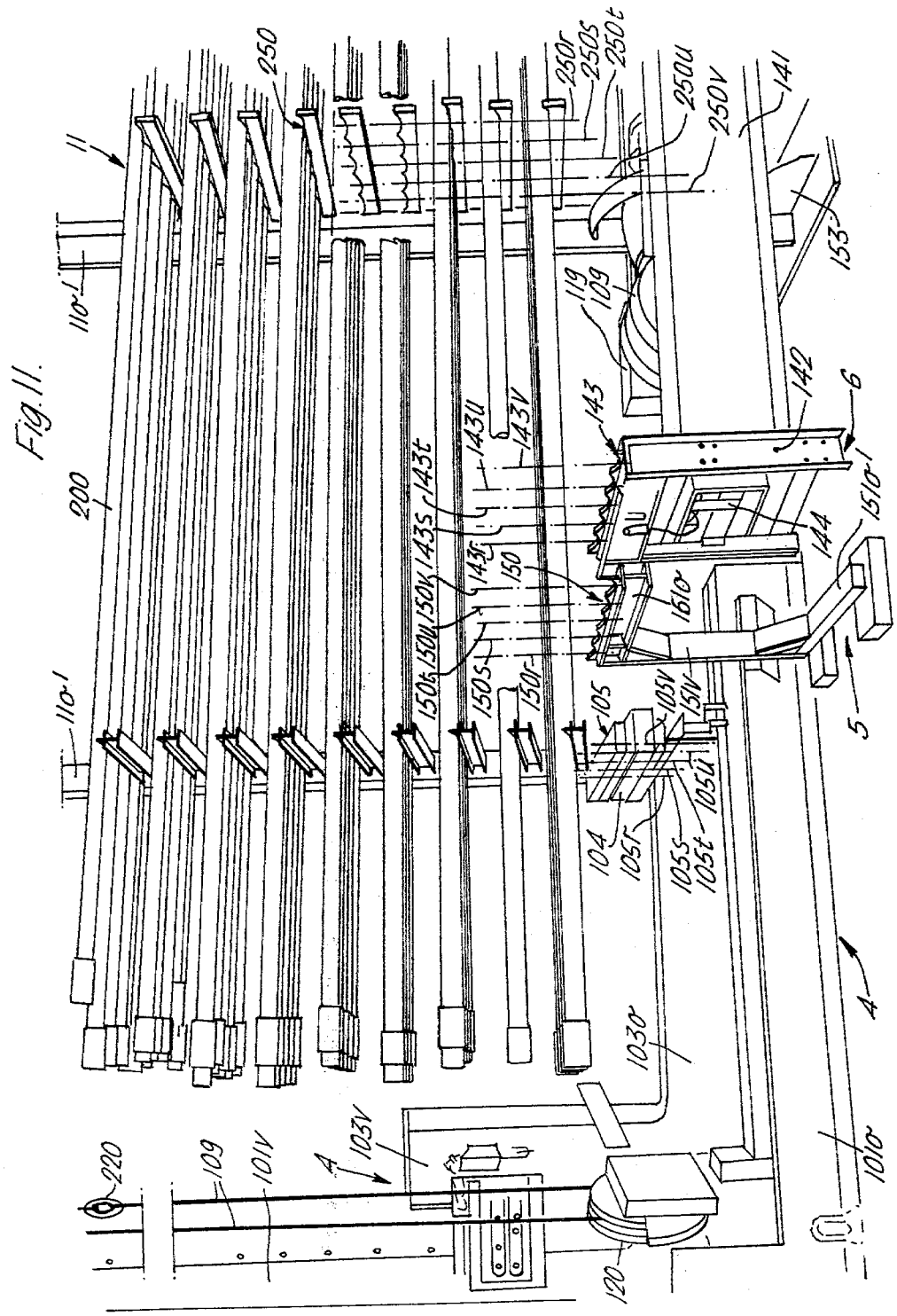

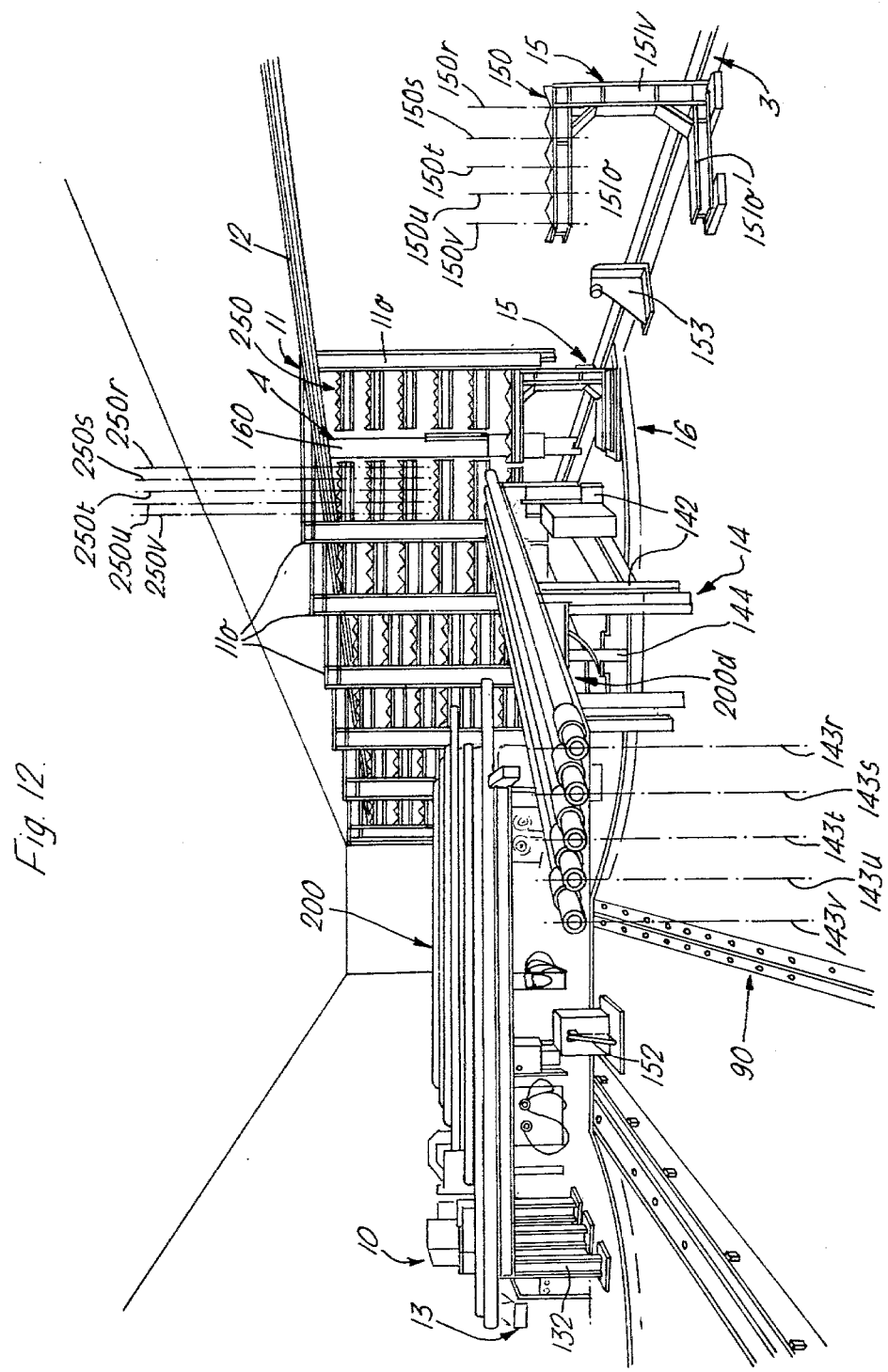

SYSTEM FOR TRANSFERRING AND STORING ELONGATED ELEMENTS

SUMMARY OF THE DISCLOSURE

This invention relates generally to the art of material handling and it is concerned with new and useful means for handling tubes or bars or like elongated elements being conveyed to or discharged from modern processing lines.

In conventional handling installations for use in processing lines generally inclined supports, conventional cranes and/or roller conveyors are installed at the delivery sides, outside and/or inside of the processing area, to receive the tubes or bars and convey them, sometimes only in one obliged direction, laterally of its length or axsially, to the processing lines or to the packaging or shipment.

Sometimes such conventional handling equipments cause material flow and storage problems, they are not capable of handling the full production rate of the modern processing lines and/further result in a noisy impact and shock to the outer tube or bar surface, which in the case of machined or coated tube or bar surface can cause serious damage to the outer product surface or to the coating. The present invention is directed to a solution of such problems and has a general objective the provision of a novel tubes or bars handling system, in which said elongated elements are generally not rolled, dragged or dropped during tube or bar movement. A main object of this invention is to provide new and useful handling means for laterally receiving groups of spaced elongated elements at one or more delivery stations and axially transferring them intermittently, in opposite directions, into one of the several storage cantilever supports, adjacent to the processing line, or transferring said elongated elements, through intermediate supporting stations and elevating and rotating means, to the processing lines or to the packaging and shipment.

A more specific object of the present invention is to provide, for use in a modern processing line, means for intermittently spacing of tubes or bars delivered from a conventional fork lift truck at one or more delivery station located outside of the processing line or delivered from the outlet end of the processing line; means for intermittently laterally removing from said spacing station or from an intermediate supporting station groups of said elongated elements, longitudinally and vertically transporting them, in the selected direction, and laterally depositing them onto one of the several storage cantilever supports or onto another intermediate supporting station, at inside and adjacent to the processing area or onto one of the discharging station at the outside of the processing line; means for intermittently laterally removing groups of spaced elongated elements from an intermediate supporting station at the inlet end of the processing line or from a spacing station at outlet end of the processing line, rotating them through 90° and depositing them on the inlet fixed supports at the inlet end of the processing line or onto the intermediate supporting station at the outlet end of the processing line.

A further object of the present invention is to provide material handling system of the type referred above, which is rigid in construction, economical to manufacture, adequate for a partial or full automation, flexible in operation, simple to maintan and repair.

BACKGROUND OF THE INVENTION

In conventional tubes or bars handling installations for use in the processing lines of the type to which this invention pertains generally inclined supports, conventional cranes and/or roller conveyors are disposed at the delivery sides, outside and/or inside of the processing area, to receive tubes or bars and to convey them laterally of its length or axially to the processing line or to the packaging and shipment. These methods for transfer of tubes or bars are sometimes not capable of handling the full production rate of the modern processing lines and further result in a noisy impact and shock to the outer tube or bar surface which in the case of machined or coated tube or bar surface can cause serious damage to the tube or bar surface or to the coating. This invention provides increased flow and storage capacity and avoids or substantially reduces noise and such tube or bar surface damage in the handling of such elongated elements.

BRIEF DESCRIPTION OF THE DRAWINGS

The object and the advantages of the present invention will become apparent as the description proceeds with the aid of the accompanying drawings which show a typical but not limiting solution, for two processing lines that are positioned on the same longitudinal axis and alternatively for two processing lines that are laterally spaced apart from each other, disposed parallel and specular each other.

FIGS. 1a–1f represents schematically the whole of a preferred embodiment of the system for transferring and/storing the elongated elements for use for two processing lines that are disposed on the same longitudinal axis;

FIG. 1a shows schematically a plan view of the system;

FIGS. 1b, 1c, 1d, 1e and 1f represent the cross sectional view along the corresponding lines 1b—1b, 1c—1c, 1d—1d, 1e—1e, 1f—1f, of FIG. 1a;

FIG. 1g represent the longitudinal sectional view along the line 1g—1g of FIG. 1a;

FIG. 2 represents schematically a plan view of another preferred embodiment of the system for transferring and storing elongated elements for use for two processing lines that are laterally spaced apart from each other and are parallel and specular each other.

FIG. 3 represents schematically a longitudinal side view of a translating carrier means 4 or 34 FIGS. 1a–1f;

FIGS. 4a–4d represents on a large scale, one of at least two rack beams forming a bar assembly means 2 (or 13, 32, 42) of FIG. 1a in vertical sectional view (FIG. 4a) partial side wiew of one detail thereof in a first position (FIG. 4b) and in a second position (FIG. 4c) and one of at least two rack beams forming a discharging station 39 or 40 of FIG. 1 in vertical section view (FIG. 4d);

It should be noted that element 2 (FIGS. 4a–4c) is merely illustrative of each of elements 2, 13, 32 and 42 (FIGS. 1a–1f) and that element 39 (FIG. 4d) is merely illustrative of each of elements 39 and 40 (FIGS. 1a–1f).

FIG. 4a shows also a plurality of tubes being engaged by gravity swinging stop members 127.

FIG. 5 represents on a large scale a partial view of the element engaging fork members 105 of the translating carrier means 4 (in various steps during the operational sequence of said fork members), the intermediate supporting means 15, the cantilever supports 11o of the racking system 11, the bar assembly means 13 and the rotating carrier means 14 of FIGS. 1a-1f in the first position 14 coupled to the bar assembly means 13.

FIG. 6 represents on a large scale a view of the bar assembly means 13, the rotating carrier means 14 in the first position 14 coupled to said bar assembly means 13 and in the second position 14a coupled to the intermediate supporting means 15, the element engaging fork members 105 (in various operational steps) and the intermediate supporting means 15 of FIG. 1a;

FIG. 6a represents on a large scale the partial view "Z" of the rotating carrier means 14a. The small letters a, b, c, d, e, f, g, h, and i, that follow the part number represent the various step location occupied from the movable parts successively in the space during the movement.

FIG. 7 represent on a large scale the plan view of a tipical rotating carrier means 6 of FIG. 1;

It should be noted that rotating carrier means 6 is merely illustrative of each of rotating carrier means 6, 14, 17, 22, 27 and 36 of FIG. 1a.

FIG. 8 represent on a large scale the side view of a tipical intermediate supporting means 5 of FIG. 1;

FIG. 9 represents on a large scale the side view "W" of the rotating carrier means of FIG. 7.

FIG. 10 represents on a large scale the side view of the movable supporting means 25 of FIG. 1a that are disposed at the inlet end zone 29m of the processing line 29 and of the cantilever inlet fixed supports 8, 24 disposed at the processing inlet end zone 9m and 29m of FIG. 1a respectively.

FIG. 11 represents in a perspective view and on a large scale a portion of the whole of the translating carrier means 4, the intermediate supporting means 5, the rotating carrier means 6 of FIG. 1a.

FIG. 11 shows also groups of equally spaced tubes in storage position on the cantilever arms of the racking system 11a prior to being conveyed to the processing line.

FIG. 12 represent in a perspective view and on a large scale a portion of the whole of the processing line 9, the processing machines 10, the bar assembly means 13, the double cantilever racking system 11, the intermediate supporting means 15 and the rotating carrier means (In an intermediate position) 14 of FIG. 1a.

FIG. 12 shows also a plurality of laterally equally spaced tubes 200 being moved from the second bar assembly means 13 to the second intermediate supporting means 15 for the subsequent conveying to the storage racking system 11.

Referring now in particular to FIGS. 1-12 of the drawings a brief description of the assemblies of the system and of the sub-assemblies thereof will now be given whereby the detailed description will be more easily understood.

Assembly Drawing Of The Preferred Embodiment.
FIG. 1

The schematic assembly of FIGS. 1a-1f is comprising the following components: first bar assembly means-2, through track 3 at floor level, aerial track 12, translating carrier means 4, first intermediate supporting means 5, first rotating carrier means 6, circularly through track 7 at floor level, inlet accumulating supports 8, processing line 9 having the longitudinal axis 60, processing inlet end zone 9m, processing central zone 9c, processing outlet end zone 9v, processing machines and control equipments 10, cantilever racking system warehouse 11, shelves 11o and 11o' of said racking system, laterally spaced and disposed parallel to each other a central aisle 160 between said shelves 11o and 11o', said shelves 11o disposed laterally, close, parallel to and between said line 9 and the said central aisle 160, second bar assembly means 13 disposed at the processing outlet end zone 9v, second rotating carrier means 14, second intermediate supporting means 15, circularly through track 16 at floor level, rotating carrier means 17, intermediate supporting means 18, circularly through track 19 at floor level, translator carrier means 20, through track 90 at floor level, intermediate supporting means 21, rotating carrier means 22, circularly through track 23 at floor level, cantilever inclined supports 24, disposed at the processing inlet end zone 29m; supporting means 25 comprising two tilting cantilever supports, disposed laterally, close and parallel to the said inclined supports 24, first intermediate supporting means 26, first rotating carrier means 27, circularly through track 28 at floor level, processing line 29, processing inlet end zone 29m, processing central zone 29c, processing outlet end zone 29v, aerial track 31, second bar assembly means 32, disposed at the processing outlet zone 29v, through track 33 at floor level, translating carrier means 34, second intermediate supporting means 35, second rotating carrier means 36, circularly through track 37 at floor level, cantilever racking system (warehouse), 38, shelves 38o and 38o' of said racking system 38, laterally spaced and disposed parallel to each other, central aisle 170 between said shelves 38o and 38o', said shelves 38o disposed laterally, close, parallel to and between said processing line 29 and said central aisle 170, discharging station 39, discharging station 40, first bar assembly means 42, shop-building limits 43, outer storeyards 44 (not shown); tubes or bars or elongated elements 200, that are to be manufactured by the processing line 9 or 29; the arrow 51 shows the direction of rotation of any above-mentioned rotating carrier means loaded with said elongated elements 200; the arrow 52 shows the direction of the transversal shifting of a plurality of elongated elements 200, that is the shifting of said elongated elements with a direction perpendicular to the longitudinal axis of said elongated elements; the arrow 53 shows the direction of the axial shifting of a plurality of elongated elements, elements, that is the shifting of said elongated elements with a direction coincident with the longitudinal axis of the said elongated elements; the direction of the arrows 51-52-53 shows the direction of the flow of said elongated elements during their movement for the forwarding to the processing line 9 or 29, for the discharging from said processing lines and for the storing in the warehouses 11 and 38.

Assembly Drawing of the Alternatively Preferred Embodiment FIG. 2

The schematic assembly of FIG. 2 is comprising the same components listed above for the assembly of FIG. 1a, but said components are disposed in alternative lay-out to that as shown in FIG. 1a, and therefore like components have like reference number in both assembly drawings of FIG. 1a and FIG. 2 and in the other attached drawings of FIG. 3-12. The lay-out shown in FIG. 2 is typical for a system for transferring and storing elongated elements for use for 2 processing lines, that are laterally spaced and disposed parallel and specular to each other.

The only components added in the assembly of FIG. 2, with respect to FIG. 1a, are the following:

Line-to-line trasverser 45 for the translator carrier 20, through tracks 46 at floor level for the traverser 45, aisle-to-aisle traverser 47 for the translating carrier means 4, through track 48 at floor level for the traverser 47, aisle-to-aisle traverser 49 for the translating carrier means 34, through tracks 50 for the traverser 49.

Assembly Drawing of the Translating Carrier Means FIG. 3

The schematic assembly of FIG. 3 shows the translating carrier means 4 or 34 of FIGS. 1a-1f and is comprising the following components: first upright frame members 101, second horizontal frame bar member 102, third movable frame members 103, elements engaging fork members 104, seat means with shaped notches 105 mounted on the said fork members 104, electric motor, brake and gear units 106, movable guide rollers 107b and 107t, movable guide rollers 108, powered wheel 111, idle wheels 112, lower movable guide rollers 113, upper movable guide rollers 114, electric motor and brake unit 115, electric drive motor and brake unit 116, winch 119.

Assembly Drawing of the Bar Assembly Means FIG. 4a

The assembly shown in FIG. 4a is comprising the following components: supported beam end portion 121, stopping-releasing equipment 122 (said equipment 122 comprising first hydraulically operating stopping-releasing member 123, second hydraulically operating stopping-releasing member 124, double-acting cylinder-piston unit 125, levers 134, shafts 135) overhanging beam end portion 126, gravity swinging stop members 127s', 127t', 127u', 127v', hinge pins 128, fixed stop member 129, upright support members 132, stop members 133, pads 136 (made of material which will not mar the tube engaged surface).

The assembly shown in FIG. 4d is comprising at least two laterally spaced inclined beams 110, disposed parallel to each other and transversely to the processing line 19 or 29 and to the central aisle 160 or 170 of the warehouse 11 or 38 respectively, said beams 110 being supported on the upright support legs 131 fixed to the foundation.

Assembly Drawings of the Rotating Carrier Means FIG. 7-FIG. 8-FIG. 9

The schematic assembly shown in the mentioned figure is comprising the following components: first rotating frame member 141, second vertically movable frame members 142, seat means with equally spaced "V" shaped notches 143 (said seat means 143 mounted on the said second frame members 142), double-acting cylinder-piston units 144, vertical guide members 145, electric drive motor, brake and gear unit 146, powered wheel 147, idle wheel 148, upright trunnion and thrust bearing 149.

A detailed description of the system and the various device will now be given.

For a more complete understanding of the present invention, referring now to the topographic position of the various main handling devices and to the functions thereof regarding the forwarding of the elongated elements to the processing line and the discharging of said elongated elements from said processing line, it will be named hereinafter, as already above pointed out in the brief description, some main devices with the foreword "First", and some others with the foreword "Second", whereby the foreword "First", in this case, is to be understood that the said device will be involved in the loading operations of the raw or semi-finished elongated elements for conveying them to the processing line 9 or 29 for the subsequent operations by the processing machines 10 or 30 and the forward "Second" is to be understood that said device will be involved in the unloading or discharging operations of the semi-finished or finished elongated elements, for conveying them back to the processing inlet end zone 9m or 29m in the case of semi-finished products, or to the packaging or shipment in the case of finished products. Therefore we will specified in brief hereinafter the topographic position and the function of the following devices using the foreword "First" or "Second" as above stated, and thus it will be named:

FIRST BAR ASSEMBLY MEANS

The bar assembly means 2 and the bar assembly means 42, that are disposed outside and parallel to the processing line 9 and 29 respectively;

SECOND BAR ASSEMBLY MEANS

The bar assembly means 13 and the bar assembly means 32, that are disposed inside and on the prolongation of the processing outlet end zone 9v and 29v respectively.

FIRST INTERMEDIATE SUPPORTING MEANS

The intermediate supporting means 5 disposed parallel to and between the prolongation of the processing inlet end zone 9m and the central aisle 160 of the warehouse 11, the intermediate supporting means 26 disposed parallel to and between the prolongation of the processing inlet end zone 29m and the central aisle 170 of the warehouse 38.

SECOND INTERMEDIATE SUPPORTING MEANS

The intermediate supporting means 15 disposed parallel to and between the prolongation of the processing outlet zone 9v and the central aisle 160 of the warehouse 11, the intermediate supporting means 35 disposed parallel to and between the prolongation of the processing outlet zone 29v and the central aisle 170 of the warehouse 38.

FIRST ROTATING CARRIER MEANS

The rotating carrier means 6 disposed at the processing inlet end zone 9m, the rotating carrier means 27 disposed at the processing inlet end zone 29m.

SECOND ROTATING CARRIER MEANS

The rotating carrier means 14 disposed at the processing outlet end zone 9v, the rotating carrier means 35 disposed at the processing outlet end zone 29v.

Referring now to the drawings FIGS. 4a, 4b and 4c, it should be noted that each of the first and second bar assembly means 2, 42 and 13, 32 respectively is formed of at least two substantially horizontally extending laterally and parallel spaced rack beam assemblies shown in the mentioned FIG. 4a (This FIG. 4a shows only one element -2- that is merely illustrative of each of elements 2, 13, 32 and 42 and that in particular the said second bar assembly means 13 or 32 has a total height above the floor level substantially equal to the height of the corresponding intermediate supporting means 15 or 35 respectively disposed at the processing outlet end zone 9V and 29V respectively.

The rack beam assembly 2 shown in FIG. 4a, 4b and 4c comprises an end portion 121, supported on and rigidly connected to vertical extending leg members 132 fixed to the foundation and the other end portion 126 overhanging and terminating with a fixed stopping member 129, said rack beam downward extending from said supported end portion 121, which has pivotally mounted thereon first hydraulically operating stopping-releasing member 123, second hydraulically operating stopping-release member 124, operating means as levers 134, shafts 135, double-acting cylinder-piston unit 125 cooperating with said stopping-releasing members 123 and 124 so that when the first stopping-releasing member 123 has a stopping position the second stopping-releasing member 124 will release the relative stopped tube and when the said second stopping-releasing member 124 returns to the original stopping position, the first stopping-releasing member 123 will release the relaive stopping tube, returning thereafter back to the original stopping position to stop the subsequent tube, that in the meantime has been rolling on the beam end portion 121; said overhanging end portion 126 having pivotally mounted thereon a plurality of gravity swinging V-shaped stop members, equally spaced apart from one another and from the above-mentioned fixed stopping member 129, said swinging stop members, which will be named 127s', 127t', 127u', 127v' being so arranged that the vertical axes, referred to the first bar assembly means 2 and indicated with 127r, 127s, 127t, 127u and 127v, passing through the section centers of the five laterally equally spaced engaged tubes at the right of the figure are substantially aligned with the corresponding axes 250r, 250s, 250t, 250u, 250v, respectively, said axes 250 passing through the centers of the seat means with "V" shaped notches 250 mounted on the cantilever arms of the shelves 11o or 11o' of the warehouse 11 shown in FIG. 1a, 11 and 12. Further each vertical plane containing a pair of said vertical axes as 127r, 250r; 127s, 250s, 127t, 250t; 127u, 250u; 127v, 250v, results parallel to the longitudinal axis 60 of said processing line 9 and to the centra aisle 160 of said warehouse 11; each gravity swinging stop member 127 having a first "No stopping" position 127b as shown in FIG. 4b when said swinging stop member is rotated by its own weight in anti-clockwise direction and stopped by the relative below-located stop member 133 and a second "stopping" position 127c as below in FIG. 4c, when it is rotated in a clockwise direction by the counter-weight of an elongated element rolled thereon along the overhanging beam end portion 126 and stopped from the adjacent gravity swinging stop member.

We will now describe the spacing operations sequence in order to form a plurality of laterally equally spaced tubes that will be handled during the subsequent movements as a single unit formed of a plurality of single tubes.

The first tube r released by the second stopping-releasing member 124 will roll along the overhanging beam end portion 126 down to the stopping fixed member 129, by which it will be stopped in the position 127r, while the below-lying stop member 127s' will be rotated in a clockwise direction to its stopping position by the action of the counter-weight of said tube 127r loaded thereon; successively the second tube s that in the meantime, released by the first stopping-releasing member 123 will be rolling to contact the second stopping-releasing member 124 and, released by said member 124 will roll along the beam end portion 126 down to the swinging stop member 127s', by which it will be stopped in the position 127s, while the below-lying stop member 127t' will be rotated in a clockwise direction to its stopping position by the action of the counter-weight of said tube 127s loaded thereon; successively the third tube t, stopped and thereafter released by the second stopping-releasing member 124, will roll along the beam end portion 126 down to the swinging stop member 127t', by which it will be stopped in the position 127t, while the below-lying stop-member 127u' will be rotated in a clockwise direction to its stopping position by the action of the counter-weight of said tube 127t loaded thereon; successively the tube u, stopped and thereafter released by the second stopping-releasing member 124 will roll along the beam end portion 126 down to the swinging stop member 127u', by which it will be stopped in the position 127u, while the below-lying stop member 127v' will be rotated in a clockwise direction to its stopping position by the action of the counter-weight of said tube 127u loaded thereon; lastly the tube v, stopped and thereafter released by the second stopping-releasing member 124, will roll along the beam end portion 126 down to the swinging stop member 127v', by which it will be stopped in the position 127v.

Referring now to, in particular, the drawings FIGS. 3 and 11, the translating carrier means 4 or 34 shown in said drawings comprises:

Two vertically and longitudinally extending L-shaped first frame members 101, each made of an upright frame member 101v and an horizontal base frame member 101o rigidly connected to each other to form said L-shaped structure, said first frame members 101 having pivotally mounted on the top end of said upright frame members 101v the guide rollers 114 (for the guiding of said translating carrier means 4 or 34 along the aerial track 12 or 31 of FIG. 1 respectively) and the fixed pulley 110t horizontally spaced and disposed in a pair close to each other, in the same vertical plane, (for the guiding of the wire ropes 109) and having pivotally mounted on the lower portion of the base frame members 101o the idle wheels 112, the powered wheels 111 actuated by the motor and brake unit 116, the guide rollers 113 (for the translation and the guiding of said translating carrier means 4 or 34 along the through track 3 at floor level or 33 of FIG. 1 respectively), the fixed pulley 110b for the guiding of the wire rope 109; a longitudinally extending second frame bar member for connecting in a rigid assembly the end portion of the longitudinally extending lower parts 101o of said first frame members 101; two L-shaped third frame members 103 vertically movable along the upright frame members 101v of said first frame members 101 between a lowermost position 103a and an uppermost position 103b; said third frame members 103 being longitudinally guided along said upright frame members 101v by the guide rollers 107t, 107b and 108, said rollers 107t and 107b being pivotally mounted at the upper and lower end respectively of the vertical arms 103v of said third frame members 103, said rollers 108 being pivotally mounted adjacent to and between said rollers 107t and 107b; said third frame members being actuated for the vertical movement by a common mechanism including the winch 119 and the motor and brake unit 115, that are mounted substantially on the central zone of said second frame member 102, said winch 119 being rotated in a clockwise direction and in an opposite anticlockwise direction to unwrap and to wrap up respectively the wire rope 109; said rope 109 starting from the upper fixed point 220 at the top of the first frame member 101 extends vertically downwards, thereafter wraps up around the movable pulley 120 (pivotally mounted on said third frame member 103) and, being rotated through 180°, goes up vertically, thereafter wraps up around the fixed pivotally mounted pulley 110t and being rotated through 180° extends vertically downwards, thereafter wraps up around the fixed, pivotally mounted pulley 110b, and being rotated through 90°, extends substantially horizontal to the winch 119 therewith joins in a movable connection.

As it would be understood, the rotation of said winch in an anticlockwise direction will cause the raising of said third frame members 103 and the rotation in a clockwise direction (opposte direction) will cause the lowering of said third frame members; two retractable fork members 104 having mounted on their upper edge a plurality of equally spaced seat means with V-shaped notches for the engaging of the elongated elements supported thereon; as it should be noted in the drawings FIGS. 5 and 11 the vertical axes 105r, 105s 105t, 105u and 105v are shown, passing through the centers of said V-shaped notches; each of said retractable fork members 104 being mounted by guide members (not shown) at the upper edge of the end portion of said horizontal arm 103o and being extracted horizontally and transversely to said third frame member 103, in opposite directions, by a well-known mechanism 106, which includes substantially an electric motor with reducer, gears and brake, said mechanism assembly 106 mounted on said horizontal arm 103o, adjacent to said fork members 104; driver's cab 118 for the operator of the translating carrier means, in the case of a manual or semi-automatic operation; the well-known cables 230, which extend longitudinally and vertically and are supported and guided by a plurality of rollers (not shown) that are moving along the aerial track 12 or 81, said cables being provided for the transmission of all controls for the translation of the translating carrier means 4 or 34, for the vertical movement of the said third frame members 103 and for the horizontal movement of the said retractable forks 104. It should be noted that the distance between the vertical arms 103v of said third frame members 103 results substantially greater than the greatest length of the elongated elements to be moved and that the distance between the horizontal arms 103o of said third frame members 103 is substantially smaller than the smallest length of the elongated element to be moved. The total height of the upright frame members 101 is substantially equal to the total height of the shelves 11o, 11o' or 38o, 38o' of the warehouse 11 or 38 of FIG. 1a and therefore substantially equal to the total height of the building, wherein the abovementioned processing line 9 or 29 would be installed; it should be noted further that the use of the embodiment shown in the attached drawings and above described allows the full utilization of the volume available in the proximity of a processing line for the storing of remarkable quantity of elongated elements and therefore allows the lowering of the investment cost of a complete modern novel production system.

Referring now in particular to the drawings in FIGS. 5 and 6, 6a 7, 9, 11 and 12, it should be noted that we represent on large scale only the rotating carrier means 6 of FIG. 1a in the real orientation schematically shown in FIG. 1a, because the other carrier means 14, 22, 27 and 36 of FIG. 1a or FIG. 2 are similar to the said rotating carrier means 6 and those have only a different orientation in the layout of FIG. 1a or 2.

Therefore any rotating carrier means comprises substantially: an horizontally extending first frame member having one end mounted on and pivotally connected to a thrust bearing 149 fixed to the foundation and the remaining portion of said first frame member being mounted on and pivotally connected to at least 2 wheels 147, 148 supported on and movable along a circularly extending fixed track at floor level 7 (or 16, 19, 23, 28, 37 as according respectively to the topographic arrangement of the rotating carrier means in the layout of FIGS. 1a or 2); one of the said two wheels is an idle wheel 148 and the other one is a powered wheel 147 actuated by a motor unit 146 provided with reducer and brake; said first frame member 141 being rotated by said operating means 146 around the vertical axis passing through the centre of said thrust bearing 149 between two outermost stop frame members 152 and 153 shown in FIG. 12, the stopping surfaces of said stop frame members 152 and 153 being laid on two vertical planes forming with each other a right angle; at least two vertically extending inverted U-shaped second frame members, transversely mounted on and parallel spaced along said first frame member 141, substantially far from said thrust bearing 149, each of said second frame members 142 having mounted thereon a plurality of equally spaced seat means 143 having the vertical axes 143r, 143s, 143t, 143u, 143v passing through the centres of said V-notches; the two vertical legs 142v of said second frame member having mounted thereon at least 4 vertical guide shoe members 145, each pair of said guide members 145 mounted on each leg 142v, said guide members 145 being movable along the corresponding vertical fixed guide members rigidly connected to said first frame members 141; each of said second frame members 142 being actuated for the vertical movement by a double acting cylinder-piston unit 144 having the upper end of the piston pivotally connected to the centre 154 of the horizontal arm 142o of said second frame member 142 and the lower end of the cylinder pivotally connected to a fixed central point 155 at the base of the said first frame member 141, said cylinder-piston units being properly operated so that when the pistons assume the fully extracted position the seat means 143 on the second frame members 142 will assume the uppermost postion 143c for the subsequent rotation of the said rotating carrier means loaded with a plurality of elongated elements; when the pistons assume the fully retracted position, the seat means 143 will assume the lowermost position 143a for the subsequent rotation of said unloaded rotating carrier means; when the pistons assume an intermediate extracted position the seat means 143 will assume an intermediate position 143b in order to vertically deposit a plurality of elongated elements on the cantilever supports 8 (or 15, 18, 24, 25, 35) shown in FIGS. 1a, 2, 8 and 10 or to vertically remove a plurality of elongated elements from the cantilever supports 5 (or 13, 21, 26, 32) shown in FIG. 1a, 2 and 8.

Referring now to the intermediate supporting means 5 (or 15, 18, 21, 26 and 35) schematically represented in FIGS. 1a and 2 and clearly illustrated in the drawing of FIG. 8, it should be noted that any of the mentioned intermediate supporting means comprises at least two vertically extending C-shaped frame members, but only one of said two members 151 is shown in the drawing of FIG. 8. The element -5- shown in FIG. 8 is merely illustrative of each of elements 15, 18, 21, 26 and 35. Said two Said frame members are disposed parallel to the central aisle 160 (or 170) of said warehouse 11 (or 38). Any of said C-shaped frame members comprises a horizontal upper cantilever arm 151o having mounted thereon, on their upper edge, a plurality of equally spaced seat means 150 having V-shaped notches to engage the elongated elements deposited thereon, a horizontal lower arm 151o' rigidly connected to the foundation and an upright arm 151v that connects rigidly the corresponding ends of the said horizontal arms 151o and 151o'; said two frame members, forming any intermediate supporting means, being disposed parallel to each other and laterally spaced along the central aisle 160 (or 170) of the warehouse 11 (or 38) and being aligned with the corresponding horizontal cantilever arms of the shelves 11o (or 38o) of the warehouse 11 (or 38), so that the vertical axes 150r, 150s, 150t, 150u, 150v passing through the centres of the V-shaped notches of the seat means 150 mounted on the horizontal arms 151o result aligned as shown in FIG. 12 with the corresponding vertical axes 250r, 250s, 250t, 250u, 250v passing through the centres of the V-shaped notches of the seat means 250 mounted on the horizontal cantilever arms of said rack shelves 11o (38o) and that the vertical planes, each of which pass through each pair of the mentioned vertical axes as 150r, 250r; 150s; 250s; 150t; 250t; 150u; 250u; 150v, 250v result parallel to each other and to the longitudinal axis 60 of the said processing line 9 (or 29) and to the central aisle 160 (or 170) of said warehouse 11 (or 38). Referring now to a processing line for the welding of the threaded coupling box to both ends of a tube we shall describe hereinafter the operation of a preferred embodiment for transferring and storing tubes that are being processed on said processing line.

Referring to all drawings FIGS. 1-12, wherein like numbers designate like parts throughout the several views we shall describe the various steps of the movement of a plurality of laterally equally spaced tubes, that are disposed on the same horizontal plan and are to be moved simultaneously from a station to another station. The transfer of a plurality of tubes loaded by a conventional fork lift truck 300 on the first bar assembly means 2 to the processing inlet end zone 9m comprises the following repeated strokes: The translating carrier means 4 moves by the operating means 116 to the X position coincident with the centre of the first bar assembly means 2, thereafter the retractable forks 104 will be moved by the operating means 115, 119 to the Y position that is slightly beneath the level of the gravity swinging stop members 127, successively said forks 104 will be fully extrated by the operating means 106 into said first bar assembly means 2, in order to obtain the alignment of the vertical axes 105r, 105s, 105t, 105u, 105v with the corresponding axes 127r, 127s, 127t, 127u, 127v respectively of said bar assembly means 2, successively said operating means 115-119 will elevate vertically the fork members 104 in order to remove a plurality of laterally equally spaced tubes from the overhanging beam end portion 126, successively the fork members 104, loaded with said tubes, will be moved back in the fully retracted position by the operating means 106 in order to allow the translation of the translating carrier means 4 by the operating means 116 to the X position coincident with the centre of the first intermediate supporting means 5, so that the fork members 104 will assume by the operating means 106 the Y position, that is slightly above the level of the seat means 150 of said first intermediate supporting means 5, successively the fork members 104 will be fully extracted into said first intermediate supporting means 5 so that the vertical axes 105r, 105s, 105t, 105u, 105v will result aligned with the corresponding vertical axes 150r, 150s, 150t, 150u, 150v of said first intermediate supporting means 5, in order to allow the vertical donward movement of said fork members 104 by the actuation of the operating means 115-119 for the subsequent depositing of a plurality of said equally spaced tubes on said intermediate supporting means 5; thereafter the unloaded fork members 104 will be moved back by the operating means 106 in the fully retracted position in order to ensure that the translating carrier means 4 will begin to repeat the same operational cycle as above described, or another one.

It should be noted that the tubes deposited on the said first intermediate means 5 will actuate an electric contact (not shown) that will cause the rotation of the first rotating carrier means 6, that rotates through 90° by the operating means 146 into said first intermediate supporting means 5 so that the vertical axes 143r, 143s, 143t, 143u, 143v, will result aligned with the corresponding vertical axes 150r, 150s, 159 t, 150u, 150v of said first intermediate supporting means 5, thereafter the double acting cylinder piston units 144 will elevate vertically the seat means 143 from the lowermost position 143a to the intermediate position 143b to remove a plurality of equally spaced tubes from said first intermediate supporting means 5 and successively to the uppermost position 143c, that is with said piston 144 in the fully extracted position, in order to allow the rotation through 90° by the operating means 146, in the opposite direction, into the cantilever inlet supports 8 (at the inlet end zone 9m of the processing line 9) so that the vertical axes 143r, 143s, 143t, 143u, 143v will result aligned with the corresponding axes 25r, 25s, 25t, 25u, 25v of said cantilever supports 8 (as shown in FIG. 10), successively said double-acting cylinder-piston units will lower vertically the seat means 143 from the uppermost position 143c back to the intermediate position 143b to deposit the tubes on said inlet cantilever supports 8 (so that said tubes successively will roll toward the processing machines 10) and successively back to the lowermost position 143a, that is with the piston 144 in the fully retracted position, in order to ensure that the first rotating carrier means will begin to repeat the same operational cycle as above described.

Referring now to the processing line 9 and 29 it should be noted that the handling means disposed along there (which may be of any conventional design) and the operations thereof are not considered as part of the present invention and thus will not be described in any further detail.

The transfer of a plurality of equally spaced tubes from the first bar assembly means 2 to the inlet cantilever support 25 (at the processing inlet zone 29m) includes similar operational steps as above described, but said operations are carried out by the translating carrier means 4, the intermediate supporting means 21 and the rotating means 22.

The tilting cantilever supports 25 that are hydraulically actuated and that are clearly illustrated in FIG. 10 will be used for the trnsfer of a plurality of equally spaced raw tubes from the warehouse 11 to the warehouse 38 of FIG. 1a, by the operation of the translating carrier means 4, the rotating carrier means 22, the said tilting cantilever supports 25 (in the upper horizontal position 25-p with the relative pistons in the fully extracted positions), the first rotating carrier means 27 and the translating carrier means 34.

Referring now to the drawing FIG. 10 it should be clearly understood that the tilting cantilever supports 25 will be arranged in a first inoperative inclined position 25p', when the relative hydraulic pistons will be disposed in the fully retracted position, and in a second horizontal position 25p, that is a working position, when the relative hydraulic pistons will be positioned in the fully extracted position; in said last position 25p the seat means with V-shaped notches having the vertical axes 25r, 25s, 25t, 25u, 25v will be positioned slightly above the uppermost level of the adjacent inclined inlet cantilever supports 24 in order to avoid the rolling of said tubes on said supports 24 (in fact the rolling will be possible when the said tilting cantilever supports are positioned in the above mentioned first inoperative position 25p') and to allow the transfer of said tubes from said supports 25p to the first intermediate supporting means 26 by the first rotating carrier means 27. Referring now in particular to the drawings FIGS. 5 and 6 and 6a we shall describe more fully hereinafter the transfer of a plurality of equally spaced semi-finished or finished tubes 200 from the second bar assembly means 13 to the cantilever arms of the shelves 11o of the warehouse 11. The semifinished or finished tubes 200 will roll from the processing central zone 9c to the first and second hydraulically operating stopping-releasing members 123 and 124 (pivotally secured to the supported end portion 121 of said second bar assembly means 13) and will assume the indicated position 200-a; successively said tubes intermittently stopped and released from said members 123 and 124 (by the actuation of double acting cylinder-piston units 125 and the relative levers 134 and shafts 135) will roll on the inclined overhanging beam end portions 126 and will be stopped successively by the stopping fixed members 129 and by the gravity swinging stop members 127, so that they will assume the position indicated as 200-b; when the last tube of a plurality of equally spaced tubes 200-b will be stopped in the stopping position corresponding to the vertical axis 127-v, an electric contact (not shown), mounted on said beam end portion 126 under the tube 127v, will actuate the rotation of the second rotation of the second rotating carrier means 14, that will be rotated through 90° by the operating means 146 into the said second bar assembly means 13, so that the vertical axes 143r, 143s, 143t, 143u, 143v will result aligned with the corresponding vertical axes 127r, 127s, 127t, 127u, 127v of said bar assembly means 13; thereafter the double-acting cylinder-piston units 144 will elevate vertically the seat means 143 from the lowermost position 143a to the intermediate position 143b to engage said spaced tubes and successively said rotating carrier means 14 with the said tubes loaded thereon will rotate through 90° by the operating means 146 into the second intermediate supporting means 15 from the original position 14, corrsponding to the outermost stopping position 152, to the position 14a, corresponding to the outer-most stopping position 153, so that the vertical axes 143r, 143s, 143t, 143u, 143v will result aligned with the corresponding vertical axis 150r, 150s, 150t, 150u, 150v of said second intermediate supporting means 15; successively the said cylinder-pistons-units 144 will lower vertically the said means 143 back from the uppermost position 143c to the intermediate position 143b to vertically deposit said tubes on the said second intermediate supporting means 15 and successively to the lowermost position 143a in order to ensure that said second rotating carrier means will begin to repeat the same transfer cycle, as above described, when the above mentioned electric contact mounted on the said bar assembly means 13 will actuate again the rotation of the said unloading rotating carrier means 14 from the outermost stopping position 152. It should be noted that the rotation through 90° of said unloaded rotating carrier means 14 by the operating means 146 from the stopping position 153 to the stopping position 152 can only be carried out by the actuation of two electric contacts (not shown), one, as above described, being mounted on the said second bar assembly means 13 and being activated when said bar assembly means will be fully loaded with all tubes forming a multiple tube unit and the other one being mounted on the said second intermediate supporting means 15 and being activated when no tube is deposited thereon, that is when the said intermediate supporting means 15 is empty; successively the translating carrier means 4 will be moved by the operating means 116 to the X position coincident with the center of the said second intermediate supporting means 15 and the fork members 104 with the seat means 105 will be moved by the operating means 115, 119 to the Y position slightly beneath the level of the seat means 150 mounted on the said intermediate supporting means 15, successively the fork members 104 with the seat means 105 will be fully extracted to the position 105a by the actuation of the operating means 106, so that the vertical axes 105r, 105s, 105t, 105u, 105v will result aligned with the corresponding vertical axes 150r, 150s, 150t, 150u, 150v of the seat means mounted on said second intermediate supported means 15; sucessively the elevating unit 115, 119 will elevate vertically the said seat means 105 from the lower position 105a to the intermediate position 105b to engage the group of tubes 200e and successively to the upper position 105c in order to vertically remove the said group of tubes from the lower position 200e to the upper position 200f; successively the operating means 106 will retract horizontally the seat means 105 from the position 105c to the fully retracted position 105d, so that the translating carrier means 4 will move along the central aisle 160 to the X position, by the actuation of the motor and gear unit 116, and simulataneously to the Y position by the actuation of the elevating motor and winch unit 115, 119, said X and Y positions being corresponding to any storage box of the shelves 11o of the warehouse 11, wherein the said group of tubes is to be deposited; in said X, Y position the fork members 104 with the seat means 105 will result positioned in the position 105e, that is slightly above the level of the corresponding seat means 250 mounted on the cantilever arms of the selected storage box of said shelves 11o; successively the operating means 106 will extract horizontally the fork members 104 with the seat means 105 into the said selected cantilever arms of said shelves 11o in order to move the seat means 105 from the position 105e to the position 105f and the group of said tubes from the position 200i so that the vertical axes 105r, 105s, 105t, 105u, 105v will result aligned with the corresponding vertical axes 250r, 250s, 250t, 250u, and 250v of the cantilever horizontal arms of said shelves 11o; successively the elevating unit 115, 119 will lower the seat means 105 from the position 105f to the position 105g to vertically deposit the group of the tubes 200 in the position 200l on the cantilever arm of the selected storage box of said shelves 11o and successively will lower the unloaded seat means 105 to the position 105$h$, thereafter the operating means 106 will retract the said fork members 104 with the seat means 105 from the position 105$h$ to the fully retracted position 105$i$ in order to ensure that said translating carrier means 4 can begin to repeat again the above described operation cycle or another one. At this point it will be noted that the tubes 200 are not rolled, dragged or dropped during the various translation and elevation movements (as above described) of the different lifting and translating means, that are part of the invention.

The tubes are relatively gently contacted by the lifting means 105 or 143 on their underside and are then lifted smoothly through the air to be placed upon the fixed seat means 150 or 250.

The transfer of a plurality of equally spaced semifinished tubes from the second bar assembly means 13 to the first intermediate supporting means 5 (in order to bring back said semi-finished tubes to the inlet end zone 9$m$ of the processing line 9 for the subsequent machining of the opposite unfinished end of said tube) is carried out through the same operational steps as above described and the only difference to be noted is that the plurality of the equally spaced tubes removed by the translating carrier means 4 from the second intermediate supporting means 15 will be deposited on the first intermediate supporting means 5 rather than on the cantilever arms of the shelves 11$o$ and successively said group of tubes will be removed by a first rotating carrier means 6 from said first intermediate supporting means 5 and deposited on the inlet inclined supports 8 at the processing inlet end zone 9$m$. The transfer of a plurality of equally spaced finished tubes from the second bar assembly means 13 to the discharging station 39 is carried out through the same operational steps as above described and the only difference to be noted is that the plurality of the spaced tubes removed by the translating carrier means 4 from the second intermediate supporting means 15 will be deposited on the inclined discharging beams 39 rather than on the said first intermediate supporting means 5; from said discharging station 39 the tubes are removed by a conventional fork lift truck 300 and successively conveyed to the packaging or shipment station. The transfer of a plurality of equally spaced semi-finished tubes from the processing line 9 (wherein the machining of only one tube end will be carried out by the processing machines 10) to the processing line 29 (wherein the machining of the opposite end will be carried out by the processing machines 30) is carried out by the translator carrier 20 shown in FIG. 1, said carrier 20 having mounted thereon element engaging members (not shown) hydraulically actuated like the second frame members 142 with seat means 143 of any rotating carrier means; said translator carrier 20 therefore will move into the second bar assembly means 13 at the processing outlet end zone 9$v$ in order to remove vertically said plurality of equally spaced tubes 200 and will successively move back along the through tracks 90 at floor level into the inlet inclined supports 24 to deposit thereon said group of equally spaced tubes, which will roll successively to the processing machines 30.

The transfer of the finished tubes 200 from the second bar assembly means 13 to the discharging station 40 is carried out by the rotating carrier means 17 through the intermediate supporting means 18 and by the translating carrier means 34.

The transfer of a plurality of equally spaced finished tubes from the second bar assembly means 13 to the shelves 38$o$, 38$o'$ of the warehouse 38 is carried out by the rotating carrier means 17 through the intermediate supporting means 18 and by the translating carrier means 34. In order to obtain, if necessary, a greater storage capacity for the warehouse 11 and 38 disposed close to the processing lines 9 and 29, as shown in the alternative embodiment represented in the drawing of FIG. 2, we have added, as schematically shown, other double-racking shelves 11$p$ and 38$p$ with central aisle 180 and 190 respectively disposed parallel to each other and parallel to the longitudinal central aisle 160 and 170 of the warehouse 11 and 38 respectively. The transfer of a plurality of equally spaced tubes from the processing lines 9 and 29 to said added double-cantilever racking shelves 11$p$ and 38$p$-respectively is carried out by the same translating carrier means 4 and 34 respectively, which will be transferred from the central aisle 160 to the central aisle 180 and from the central aisle 170 to the central aisle 190 respectively by the well-known aisle-to-aisle trasverser 47 along the through tracks 48 at floor level and by the aisle-to-aisle trasverser 49 along the through tracks 50 at floor level respectively.

The transfer of a plurality of equally spaced tubes 200 of FIG. 2 from the processing line 9 (wherein the machining of only one tube end will be carried out by the processing machines 10) to the processing line 29 (wherein the machining of the opposite tube end will be carried out by the processing machines 30) is carried out by the translator carrier 20, which will move into the second bar assembly means 13 to vertically remove said spaced tubes 200, successively will move back along the through tracks 90 onto the transverser 45, thereafter said transverser 45 will move along the through tracks 46 to the outermost position 45$a$, with the corresponding translator carrier 20 in the position 20$a$, from where said translator 20 will move along the through tracks 90$p$ into the inclined cantilever inlet supports 24 to deposit thereon the plurality of equally spaced tubes 200, which will roll successively toward the processing machines 30.

As previously stated the present system or apparatus handles a plurality of elongated elements as a single unit formed of a plurality of single elongated elements; it is also apparent that the handling of a multiple product unit by the apparatus permits the intermittent feeding and discharging of a continuous operating manufacturing line as above described. It should be further noted now that in any event however, at any given stage during the operation of the system, one group of tubes or bars or other like elongated elements can be processed on a processing line, hile another group of tubes is being discharged from said processing line and carried by the relative rotating carrier means to the corresponding empty intermediate supporting means and another group is carried by the translating carrier means to another empty warehouse box or to an empty discharging station and while another group of tubes is in the process of accumulating and spacing on a bar assembly means. It will be also noted that the system is simple in both design and operation; the components can be for the most part fabbricated from readily available standard structural shapes thus reducing the overall cost of an installation. A minimum number of standard drives is employed, thus further reducing capital expenditures as well as subsequent maintenance problems. Use of the system is not restricted to the processing lines as the tube welding line or tube end machining line or tube control line. The system may be employed wherever there exist a need for an improved arrangement for handling elongated elements.

While preferred embodiments of the invention have been described and shown in the drawings, many modifications thereof may be made by a person skilled in the art without departing from the spirit of the invention, that I do not mean to be limited to the details of construction herein shown and described other than as defined in the appended claims.

What I claim is:

1. For use in a processing line a system for transferring and storing elongated elements such as tubes, bars or similar products, comprising in combination generally first substantially horizontally extending bar assembly means, disposed parallel to and outside of said processing line, said bar assembly means having mounted thereon element stopping-releasing members and operating means for laterally receiving, stopping, releasing and laterally equally spacing a plurality of elongated elements loaded thereon from a conventional fork lift truck; second bar assembly means, disposed on the prolongation of the outlet end of the said processing line, for stopping, releasing and laterally equally spacing a plurality of elongated elements discharged thereon from said processing line; a longitudinally and vertically extending cantilever racking system, having mounted on any cantilever arm thereof a plurality of equally spaced seat means, with V-shaped notches, said racking system having a central aisle being disposed close, parallel to and along one side of the said processing line, said racking system for temporarily storing groups of laterally equally spaced elongated elements that are waiting for subsequent machining and/or treatment on the said processing line; first intermediate supporting means disposed parallel to and between the prolongation of the inlet end zone of the said processing line and the said central aisle of said racking system, for temporarily supporting a plurality of laterally equally spaced elongated elements that are waiting for subsequent transfer to inlet rack supports of said processing line; second intermediate supporting means, disposed parallel to and between the prolongation of the outlet end zone of the said processing line and the said central aisle of said racking system, for temporarily supporting a plurality of laterally equally spaced elongated elements that are waiting for subsequent transfer to said racking system or to said first intermediate supporting means or to a discharging station for the shipment; a longitudinally and vertically extending translating carrier means movable and guided on longitudinally extending fixed tracks means, said carrier having mounted thereon elements engaging members and operating means, for laterally and simultaneously removing a plurality of laterally equally spaced elongated elements from said first bar assembly means or from said second intermediate supporting means or from any pair of cantilever arms of said racking system, axially transporting them in opposite directions along said central aisle of said racking system and laterally depositing them on said first intermediate supporting means or on any pair of cantilever arms of said racking system or on a discharging station for subsequent transfer to the shipment; first horizontally extending rotating carrier means movable and guided on circularly extending fixed track means disposed at the inlet end zone of said processing line, said rotating carrier means having mounted thereon element engaging members and operating means for vertically removing simultaneously a plurality of laterally equally spaced elongated elements from said first intermediate supporting means, rotating them through 90° and vertically depositing them on said inlet rack supports of said processing line; second rotating carrier means movable and guided on circularly extending fixed track means disposed at the outlet end zone of said processing line for vertically and simultaneously removing a plurality of laterally equally spaced elongated elements from said second bar assembly means, rotating them through 90° and vertically depositing them on the said second intermediate supporting means.

2. A system for transferring and storing elongated elements according to claim 1, wherein each of said first and second bar assembly means comprises in combination at least two substantially longitudinally extending rack beams, laterally and parallely spaced, each of said rack beams having one end portion supported on and rigidly connected to vertical extending leg members fixed to the foundation and the other end portion overhanging and terminating with a fixed stopping member, said rack beam downward extending from said supported end portion, and which has mounted thereon said element stopping-releasing members and operating means which together comprise a first hydraulically operating stopping-releasing member and operating means for intermittently stopping and releasing any elongated element rolling on said rack beams and second hydraulically operating stopping-releasing member and operating means for intermittently stopping and releasing the elongated element released from said first stopping-releasing member and rolling on said rack beams, said first and second stopping-releasing members being so operating that when said first stopping-releasing member has a stopping position the said second stopping-releasing member is releasing the relative stopped elongated element and when subsequently the said second stopping-releasing member is returning on its stopping position the first stopping-releasing member is releasing another elongated element; said overhanging portion of said rack beam having pivotally mounted thereon a plurality of gravity swinging v-shaped stop members each of which has a swinging movement between a first non-stopping position, wherein it is forced when being rotated in an anti-clockwise direction by the action of its own weight, and a second stopping position, wherein it is forced when being rotated in a clockwise direction by the action of the counter-weight of any elongated element rolled thereon.

3. A system for transferring and storing elongated elements according to claim 1 wherein said translating carrier means including its said elements engaging members and operating means comprises in combination two vertically and longitudinally extending L-shaped first frame members having pivotally mounted at the bottom and the top thereof operating means for translating and guiding said first frame members on said fixed track means; a longitudinally extending second frame bar member for connecting in a rigid assembly the end portions of the longitudinally extending lower parts of said first frame members; two L-shaped third frame members mounted on and vertically movable along said first frame members by a common operating mechanism having a winch with a relative motor mounted on the center portion of said second frame bar member and by operating means pivotally mounted on and co-operating with said first and third frame members for raising or lowering said third frame members; two elements engaging fork members each mounted on and transversely disposed to the end portion of the longitudinally extending part of said third member, said element engaging fork members being moved horizontally, in opposite direction, transversely to said translating carrier means, by operating means mounted on said third frame member close to said element engaging fork member, said fork members having a plurality of equally spaced seats means mounted thereon and having V-shaped notches to engage elongated elements.

4. A system for transferring and storing elongated elements according to claim 1, wherein each of two said first and second rotating carrier means including their element engaging and operating means comprises in combination an horizontally extending first frame member having one end mounted on and pivotally connected to a thrust bearing pivotally fixed to the foundation and the remaining portion of said first frame member mounted on and pivotally connected to at least two wheels supported on and movable along said circularly extending fixed track means by operating means mounted on said first member, that is rotating to and fro around the vertical axis of said thrust bearing between two stopping fixed members disposed substantially in two vertical planes forming with each other a rightangle; two vertically extending invertedU-shaped second frame members, transversely mounted on and parallely spaced along said first member, said second frame members having mounted thereon a plurality of equally-spaced seats means having V-shaped notches to engage elongated elements; two vertically extending double-acting piston-cylinder hydraulic units, each having the upper end of the said piston pivotally connected to the centre point of the horizontal arm of the second frame member and the lower end of the said cylinder pivotally fixed to the centre point of the base of said first frame member, the piston of the said unit being movable vertically for raising or lowering said second frame member; vertically disposed guide members mounted on and spaced along the vertical legs of the said movable invertedU-shaped second members and co-operating with vertical fixed guide members mounted on said first members in order to guide said second frame members during vertical movement.

5. A system for transferring and storing elongated elements according to claim 1, in which each of two said first and second intermediate supporting means comprises in combination at least two vertically extending C-shaped frame members, laterally and parallely spaced, each having mounted thereon at the top a plurality of equally spaced seat means having V-shaped notches to engage the elongated elements and being fixed at the bottom to the foundation each of the said seat means being laid substantially on a vertical plane passing through the corresponding seat means which are disposed in a longitudinal and vertical alignment on the cantilever arms of said storage shelves located between said processing line and said central aisle of said storage racking system.

6. A system for transferring and storing elongated elements according to claims 1 or 2, wherein the said first bar assembly means and the said cantilever racking system are so arranged that each stopping surface of said first bar assembly means is resulting substantially laid on a vertical plane passing through the corresponding seat means which are disposed in a longitudinal and vertical alignment on the cantilever arms of said storage shelves of said storage racking system, said vertical planes being parallel to each other and to the longitudinal axis of said processing line.

7. A system for transferring and storing elongated elements according to claim 3, wherein said translating carrier means is so operating that the said element engaging fork members, in the fully retracted position, and the elongated elements deposited thereon can be moved along the longitudinal axis of the central aisle of said cantilever racking system, in opposite directions, and simultaneously moved along the vertical plane in opposite directions; the position of said element engaging fork members can be so adjusted that for vertically depositing on or removing from any selected pair of cantilever arms of said racking system or of said first or second intermediate supporting means a plurality of laterally equally spaced elongated elements, said elements engaging fork members, in the fully extracted position, are located above or below the level of the seat means mounted on said selected cantilever arms of said racking system or of said intermediate supporting means.

8. A system for transferring and storing elongated elements according to claim 1 or 4, wherein each of the said first and second rotating carrier means is so operating that the said movable second frame members, with the relative hydraulic pistons in the fully extracted position, and the elongated elements deposited thereon, assume a uppermost position for the subsequent rotation movement; the said second frame members, with the relative hydraulic pistons in the fully retracted position, assume a lowermost position for the subsequent rotation of said unloaded carrier means; the said second frame members with the relative hydraulic pistons in an intermediate extracted position assume an intermediate position in order to vertically remove from or deposit on the cantilever arms of the said first or second intermediate supporting means or of said second bar assembly means or of said inlet rack supports of said processing line, a plurality of laterally equally spaced elongated elements.

9. A system for transferring and storing elongated elements according to claim 2, wherein all the seat means mounted on all said cantilever arms of said cantilever racking system, and all said stopping surfaces of said gravity swinging stop members and fixed stopping members of said first and second bar assembly means are so arranged that the distance between any two adjacent seat means is equal to the distance between any two other adjacent seat means or any two adjacent stopping surfaces of said gravity swinging stop members and said fixed stopping member of said bar assembly means.

* * * * *